Patented Mar. 7, 1944

2,343,703

UNITED STATES PATENT OFFICE 2,343,703

PYRAZOLONE COUPLER FOR COLOR PHOTOGRAPHY

Henry D. Porter and Arnold Weissberger, Rochester, N. Y., assignors to Eastman Kodak Company, Rochester, N. Y., a corporation of New Jersey No Drawing. Application September 4, 1942, Serial No. 457,319

8 Claims. (Cl. 95—6)

This invention relates to photographic color-forming compounds and particularly to coupler compounds which are derivatives of pyrazolones for color forming processes of color photography.

This application is a continuation-in-part of our application Serial No. 419,172, filed November 14, 1941, now Patent 2,311,081, granted February 16, 1943.

The formation of colored photographic images by coupling the development product of aromatic amino developing agents with color forming or coupling compounds is well known. In these processes the subtractive process of color formation is ordinarily used and the image dyes are intended to be of the complementary primary colors cyan or blue-green, magenta, and yellow. The couplers which produce the cyan dyes are usually phenols or naphthols, those producing the magenta dyes are ordinarily pyrazolones or cyano acetyl compounds, and those producing the yellow dyes are ordinarily compounds containing a methylene group having two carbonyl groups attached to it. The dyes produced by coupling are azomethines, indamines or indophenols depending upon the composition of the coupler and of the developer.

In our copending application Serial No. 457,276, filed of even date herewith, we have shown that couplers believed to be acylamino derivatives of pyrazolone have valuable properties for purposes of color photography. We have now found that pyrazolone derivatives which we believe to be aryl-substituted amino derivatives of pyrazolone also possess valuable properties as couplers for the production of magenta dyes in color forming methods of color photography. Our novel couplers have the following general formula:

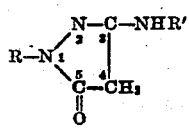

in which R and R' are aryl groups.

The following examples illustrate compounds of this general formula which are suitable for use according to our invention:

(1) 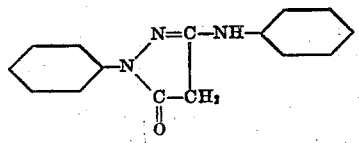

1-phenyl-3-anilino-5-pyrazolone (2) 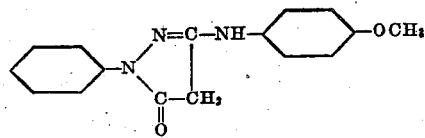

1-phenyl-3-p-anisyl-amino-5-pyrazolone (3) 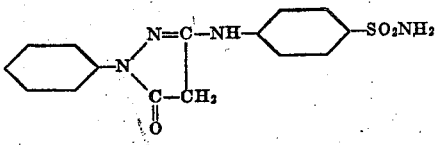

1-phenyl-3-p-sulfamylphenyl-amino-5-pyrazolone (4) 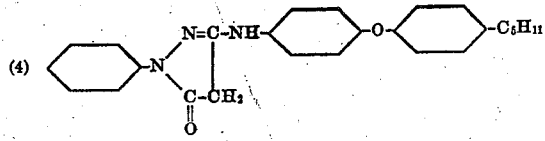

1-phenyl-3-p-(p-tert.amyl-phenoxy)-phenylamino-5-pyrazolone

The novel couplers of our invention are produced by treatment of an aminopyrazolone with the suitable aromatic amine according to a reaction which we believe proceeds as follows:

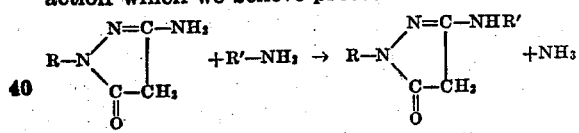

The aminopyrazolones used as starting materials in this reaction may be prepared in various ways. One suitable method which is described in our copending application Serial No. 464,650, filed November 5, 1942, involves the condensation of phenyl hydrazine with the iminoether of ethyl cyanoacetate.

The compounds of the present invention are prepared from the aminopyrazolone by treating it with the proper aromatic amine. For example, 1-phenyl-3-phenylamino-5-pyrazolone is produced by refluxing a mixture of 20 g. of 1-phenyl-3-amino-5-pyrazolone and 50 g. of aniline for one and a half hours until the evolution of ammonia slacks off. After cooling to 100° the mixture is diluted with 100 cc. of chloroform, cooled and filtered. The product is recrystallized from 300 cc. of 95% ethanol to yield 12 g. of white feathery needles; M. P. 218–220°.

Our couplers are designed for use in processes in which the coupler is incorporated in the developing solution such as those described in Mannes and Godowsky U. S. Patent 2,113,329, granted April 5, 1938, or Mannes, Godowsky and Wilder U. S. Patent 2,252,718, granted August 19, 1941. Certain of the couplers of our invention may be incorporated in sensitive emulsion layers for use in processes such as those described in Fischer U. S. Patent 1,055,155, granted March 4, 1913, Mannes and Godowsky U. S. Patents 2,304,939 and 2,304,940, granted December 15, 1942, and Jelley and Vittum U. S. Patent 2,322,027, granted June 15, 1943.

The following examples illustrate developing solutions containing the couplers used according to our invention:

*Example 1*

A. 2-amino-5-diethylaminotoluene hydrochloride _____ grams __ 2
   Sodium sulfite (anhydrous) _____ do ___ 2
   Sodium carbonate (anhydrous) _____ do ___ 20
   Potassium bromide _____ do ___ 1
   Water to _____ liter __ 1

B. 1-phenyl-3-anilino-5-pyrazolone _ grams __ 2
   Sodium hydroxide (10% solution) ___ cc __ 10

B is added to A

*Example 2*

A. Dimethyl-p-phenylenediamine sulfate____
_____ grams __ 3
   Sodium sulfite (anhydrous) _____ do ___ 5
   Sodium carbonate (anhydrous) _____ do ___ 20
   Potassium bromide _____ do ___ 2
   Water to _____ liter __ 1

B. 1-phenyl-3-p-sulmamyl - phenylamino-5-pyrazolone _____ grams __ 3
   Isopropyl alcohol _____ cc __ 100

B is added to A

The foregoing examples refer to the addition of the coupler compound to the developing solution itself. The coupler may also be added to the emulsion layer provided that suitable means are used to prevent its diffusion in the case of multilayer coatings. Special dispersing agents may be used for incorporating the coupler compound in the emulsion and in certain cases the coupler may be absorbed or adsorbed to the sensitive salt or may be combined with the sensitive salt as a chemical combination. Certain of the coupler compounds described in the present application such as No. 4 are in themselves non-diffusing and may be incorporated in the photographic layer without the use of additional agents to prevent diffusion. This coupler may also be incorporated in an emulsion layer according to the methods of Mannes and Godowsky U. S. Patent 2,304,940, and Jelley and Vittum U. S. Patent 2,322,027, referred to above.

In the development of exposed photographic silver halide emulsion layers, using the couplers of our invention, any color forming developer containing a primary amino group may be used. These include developers having two primary amino groups as well as those having one of the amino groups substituted or having substituents in the ring such as alkyl phenylenediamines and alkyl toluylene diamines. These compounds are usually used in the salt form such as the hydrochloride or the sulfate which are more stable than the amines themselves. The suitable compounds are diethyl-p-phenylenediamine hydrochloride, monomethyl-p-phenylenediamine hydrochloride, dimethyl-p-phenylenediamine hydrochloride and 2-amino-5-diethylaminotoluene hydrochloride. The p-aminophenols and their substitution products may also be used where the amino group is unsubstituted. All of these developers have an unsubstituted amino group which enables the oxidation products of the developer to couple with the color forming compounds to form a dye image.

Our development process may be employed for the production of colored photographic images in layers of gelatin or other water-permeable, colloidal carriers, such as collodion, organic esters of cellulose, or synthetic resins. The carrier may be supported by a transparent medium such as glass, a cellulose ester or a non-transparent reflecting medium such as paper or an opaque cellulose ester. The emulsion may be coated as a single layer on the support or as superposed layers on one or both sides of the support. The superposed layers may be differentially sensitized and the dyes formed therein by coupling may be bleached by an oxidizing agent such as chromic acid to colorless soluble compounds. The destruction of the dye in this way does not destroy the silver image and a silver image may be developed, bleached and developed to color images in superposed layers as described, for example, in Mannes and Godowsky U. S. Patent No. 2,113,329.

The examples and compounds set forth in the present specification are illustrative only and it is to be understood that our invention is to be taken as limited only by the scope of the appended claims.

We claim:

1. A color-forming photographic developer comprising a primary aromatic amino developing agent and a coupler compound having the probable formula:

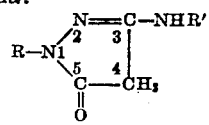

in which R and R' are aryl groups.

2. A color forming photographic developer comprising a primary aromatic amino developing agent and a coupler compound having the probable formula:

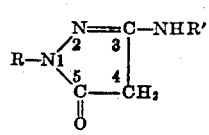

in which R and R' are aryl groups of the benzene series.

3. A color forming photographic developer comprising a primary aromatic amino developing agent and a coupler compound having the probable formula:

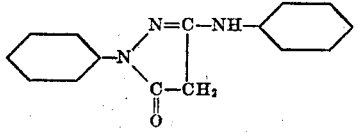

4. A color forming photographic developer comprising a primary aromatic amino developing agent and a coupler compound having the probable formula:

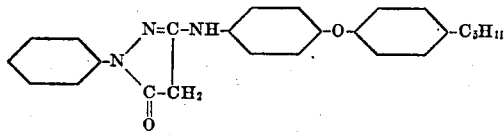

5. The method of producing a magenta colored photographic image in a gelatino silver halide emulsion layer which comprises exposing the layer and developing it with a primary aromatic amino developing agent in the presence of a coupler compound having the probable formula:

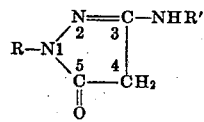

in which R and R' are aryl groups.

6. The method of producing a magneta colored photographic image in a gelatino silver halide emulsion layer which comprises exposing the layer and developing it with a primary aromatic amino developing agent in the presence of a coupler compound having the probable formula:

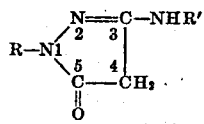

in which R and R' are aryl groups of the benzene series.

7. A photographic emulsion for forming colored images comprising a water-permeable colloidal carrier containing a sensitive silver halide and a coupler compound having the probable formula:

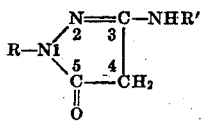

in which R and R' are aryl radicals.

8. A photographic emulsion for forming colored images comprising a gelatino silver halide emulsion containing a coupler compound having the probable formula:

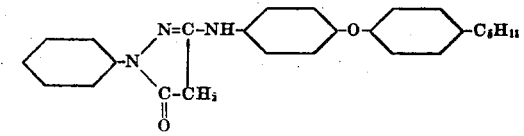

HENRY D. PORTER.
ARNOLD WEISSBERGER.